US011200007B2

(12) United States Patent
Yamada

(10) Patent No.: US 11,200,007 B2
(45) Date of Patent: Dec. 14, 2021

(54) DISPLAY METHOD, DISPLAY DEVICE, AND PRINTING DEVICE

(71) Applicant: SEIKO EPSON CORPORATION, Tokyo (JP)

(72) Inventor: Yusuke Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/910,934

(22) Filed: Jun. 24, 2020

(65) Prior Publication Data

US 2020/0409615 A1   Dec. 31, 2020

(30) Foreign Application Priority Data

Jun. 25, 2019   (JP) .............................. JP2019-117092

(51) Int. Cl.
*G06F 3/12* (2006.01)
*G06F 3/0483* (2013.01)

(52) U.S. Cl.
CPC .......... *G06F 3/1204* (2013.01); *G06F 3/0483* (2013.01); *G06F 3/1208* (2013.01); *G06F 3/1256* (2013.01); *G06F 3/1292* (2013.01)

(58) Field of Classification Search
CPC combination set(s) only.
See application file for complete search history.

(56) References Cited

U.S. PATENT DOCUMENTS

| 9,843,731 | B2* | 12/2017 | Shimosato | H04N 5/23293 |
| 2006/0146363 | A1* | 7/2006 | Choi | H04N 1/32122 358/1.15 |
| 2006/0164685 | A1* | 7/2006 | Kobayashi | H04N 1/0044 358/1.18 |
| 2010/0110493 | A1* | 5/2010 | Kato | G06F 3/121 358/1.15 |
| 2011/0188094 | A1* | 8/2011 | Nakazawa | H04N 1/04 358/474 |
| 2012/0204099 | A1* | 8/2012 | Yamada | G06F 3/0483 715/244 |
| 2012/0221943 | A1 | 8/2012 | Yamada | |
| 2012/0287165 | A1 | 11/2012 | Yamada | |

(Continued)

FOREIGN PATENT DOCUMENTS

JP   2003-276272 A   9/2003
JP   2004-282224 A   10/2004
(Continued)

*Primary Examiner* — Helen Zong
(74) *Attorney, Agent, or Firm* — Oliff PLC

(57) ABSTRACT

In a display method, a plurality of thumbnail images arranged on a first imaginary rotation axis are displayed at a display, each thumbnail image rotating about its second imaginary rotation axis intersecting the first imaginary axis, each thumbnail image also rotating about the first imaginary rotation axis. An image bundle formed of the plurality of thumbnail images includes a static part where the thumbnail images next to each other are arranged with an equal space from each other, and a dynamic part where the thumbnail images next to each other are arranged with a broader space from each other than the thumbnail images in the static part. The method includes displaying an image to be printed, in a first area of the image bundle, and displaying a printed image in a second area of the image bundle.

8 Claims, 13 Drawing Sheets

(56) References Cited

U.S. PATENT DOCUMENTS

| | | | |
|---|---|---|---|
| 2016/0016362 A1* | 1/2016 | Kim | G05B 19/4097 |
| | | | 700/98 |
| 2018/0136810 A1* | 5/2018 | Martin | G06F 3/1256 |
| 2018/0278776 A1* | 9/2018 | Nagai | H04N 1/2392 |
| 2020/0097236 A1* | 3/2020 | Miyadome | G06F 3/1285 |
| 2021/0006664 A1* | 1/2021 | Miwa | G06F 3/1296 |
| 2021/0039379 A1* | 2/2021 | Gibson | B41F 15/10 |
| 2021/0064198 A1* | 3/2021 | Yamada | G06F 3/0482 |

FOREIGN PATENT DOCUMENTS

| | | |
|---|---|---|
| JP | 2010-224739 A | 10/2010 |
| JP | 2012-164292 A | 8/2012 |
| JP | 2012-178002 A | 9/2012 |
| JP | 2012-238223 A | 12/2012 |

* cited by examiner

FIG. 2
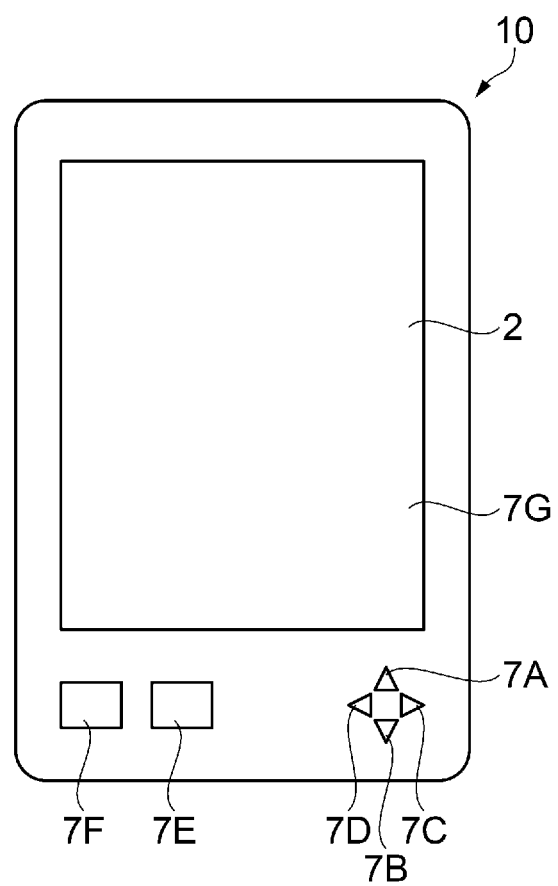
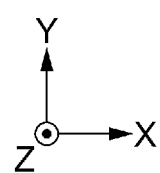

FIG. 3
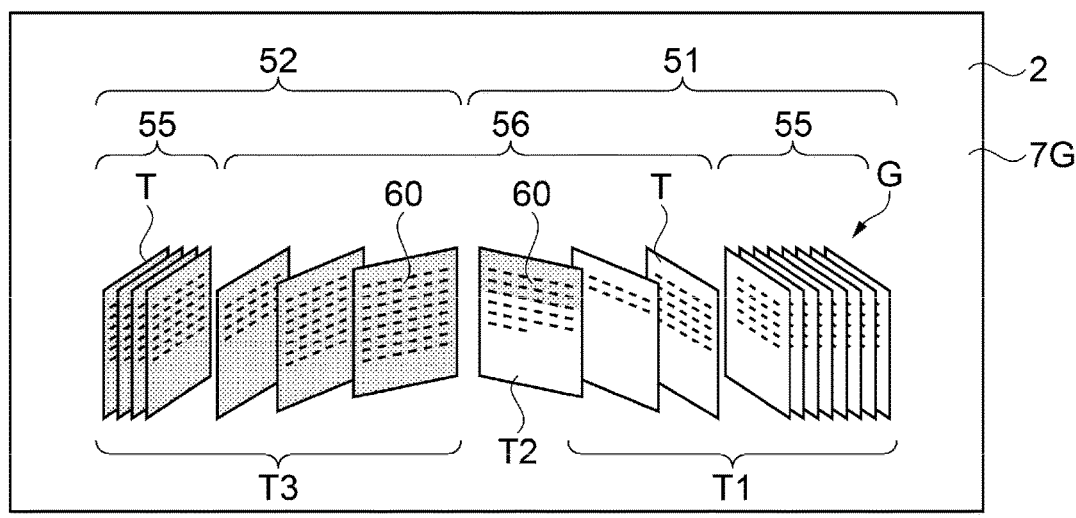
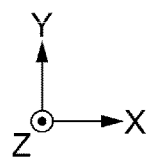
FIG. 4
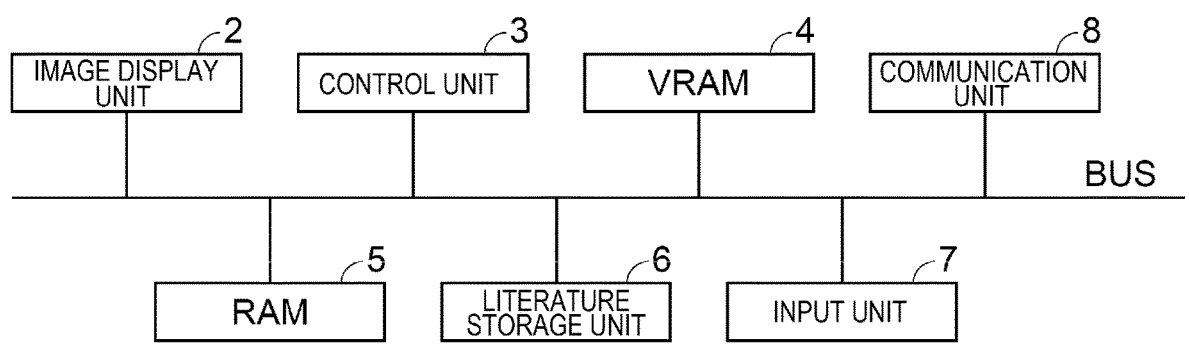

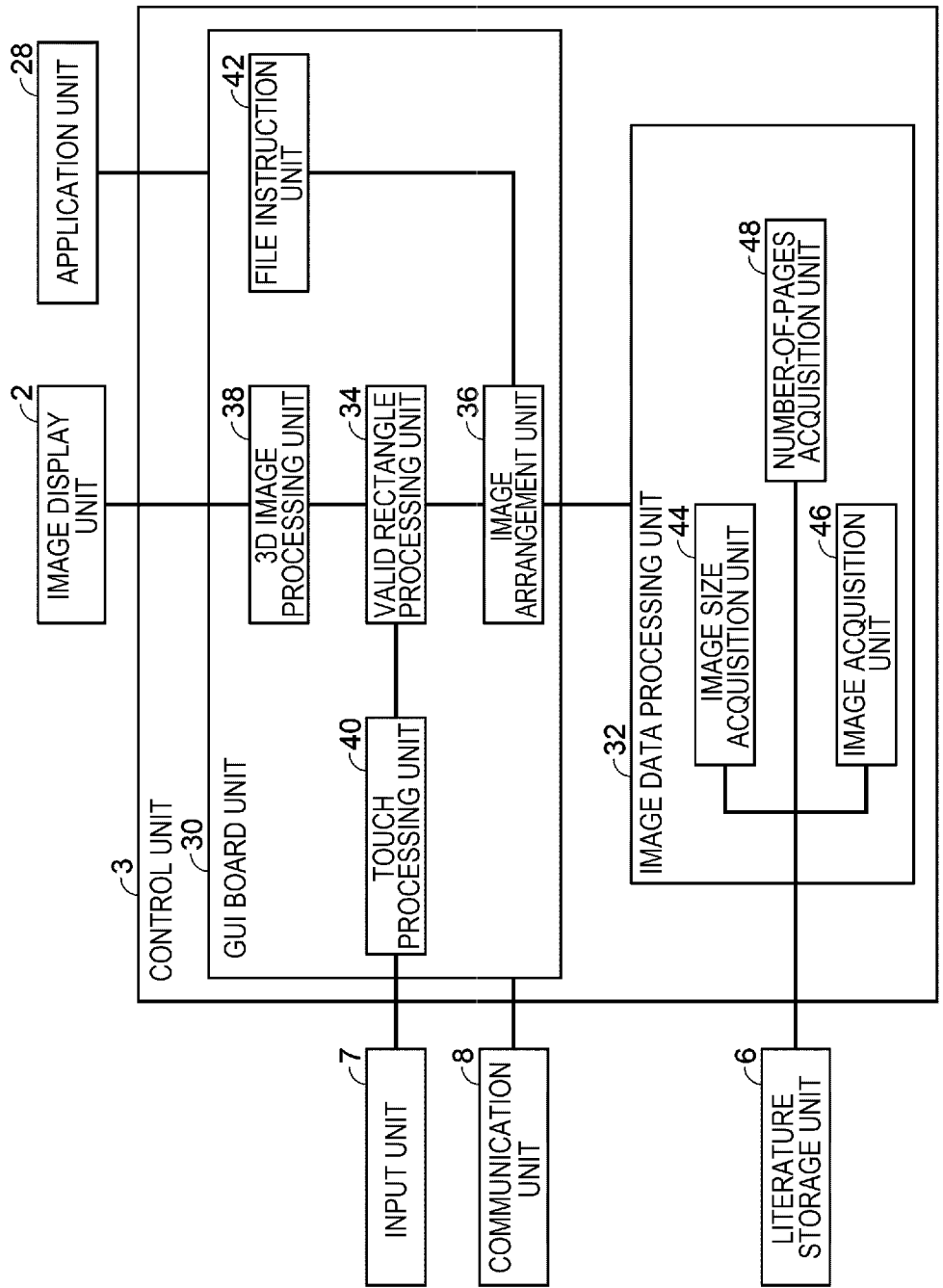

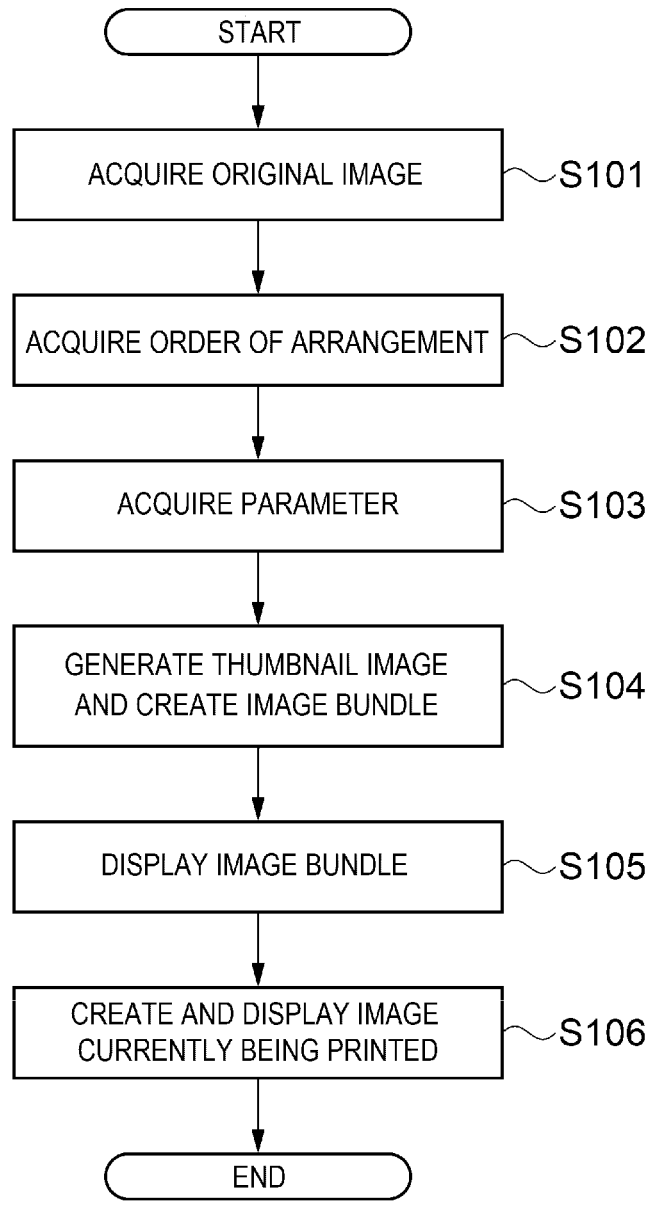

FIG. 8B
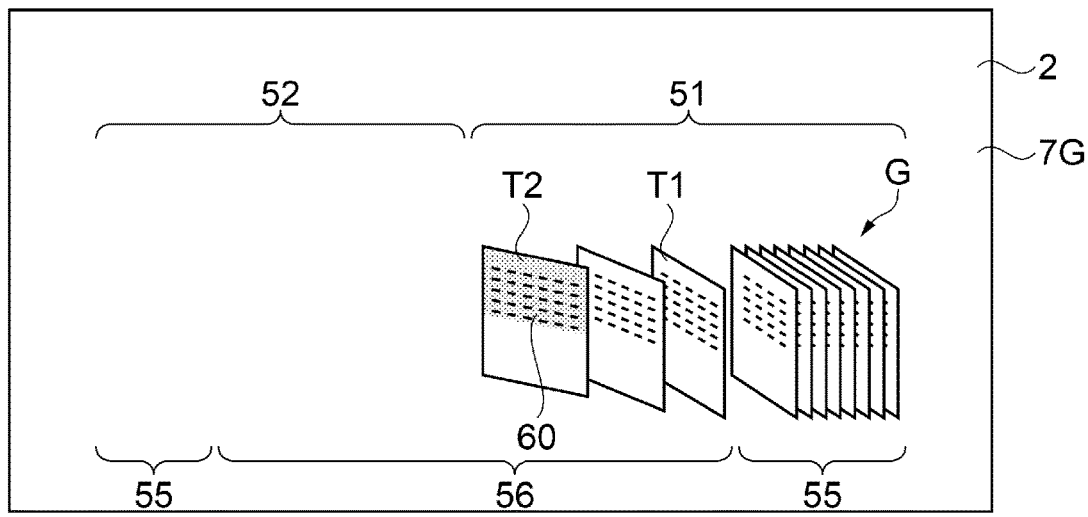
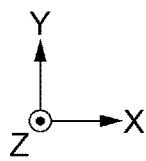
FIG. 8C
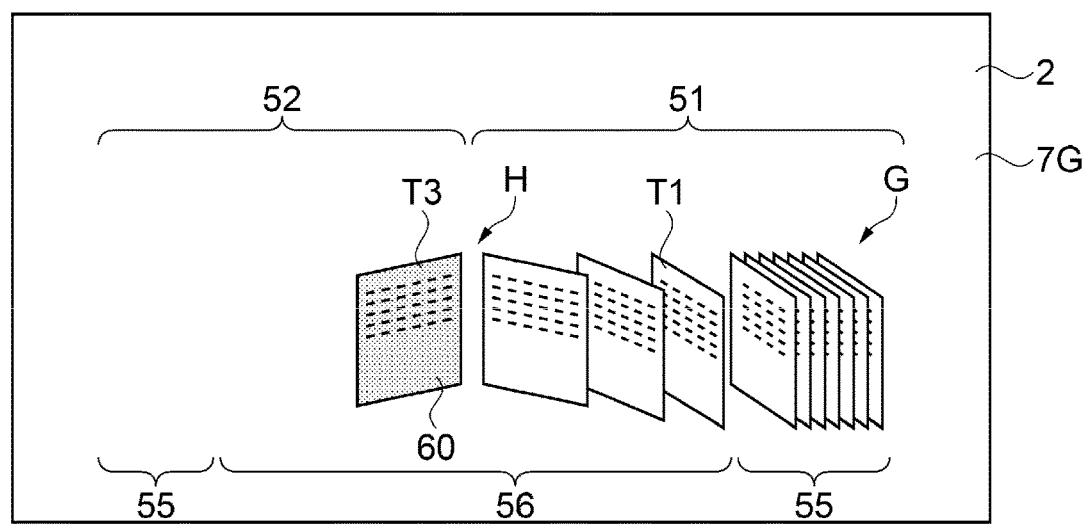
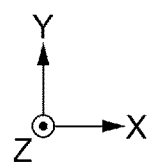

FIG. 8D
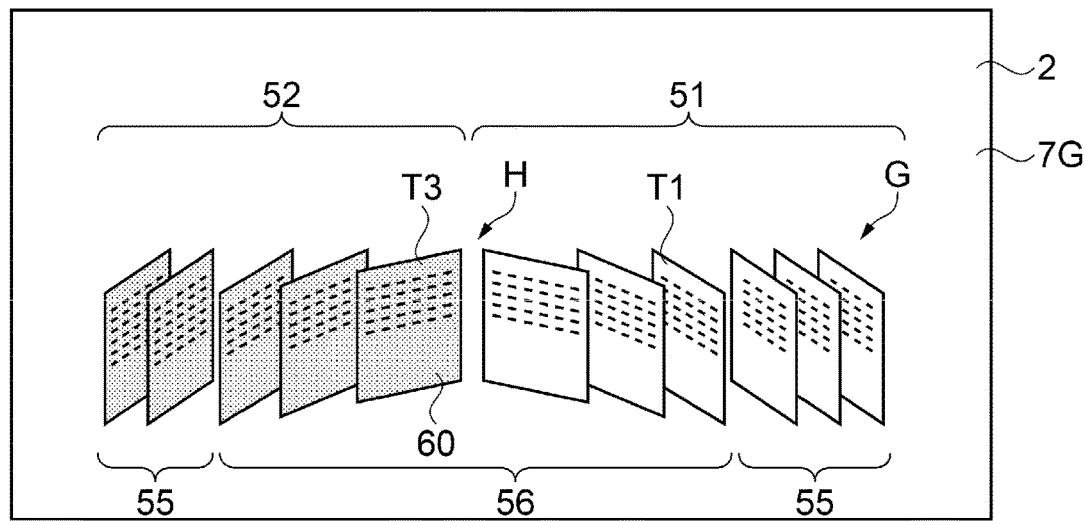
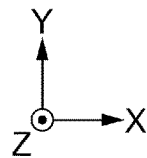
FIG. 9A
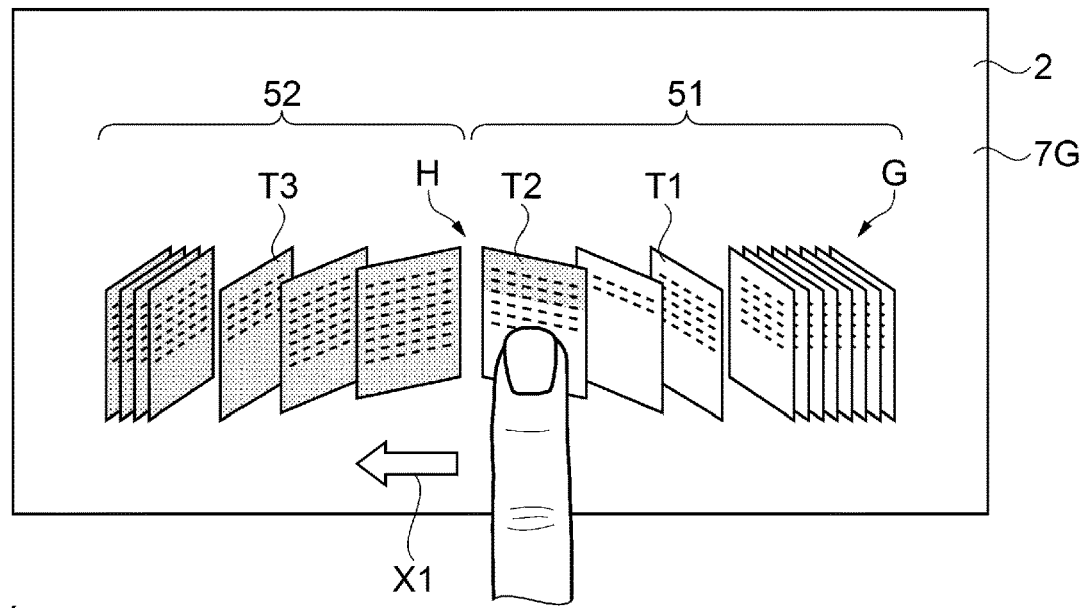
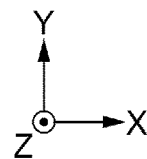

FIG. 9B
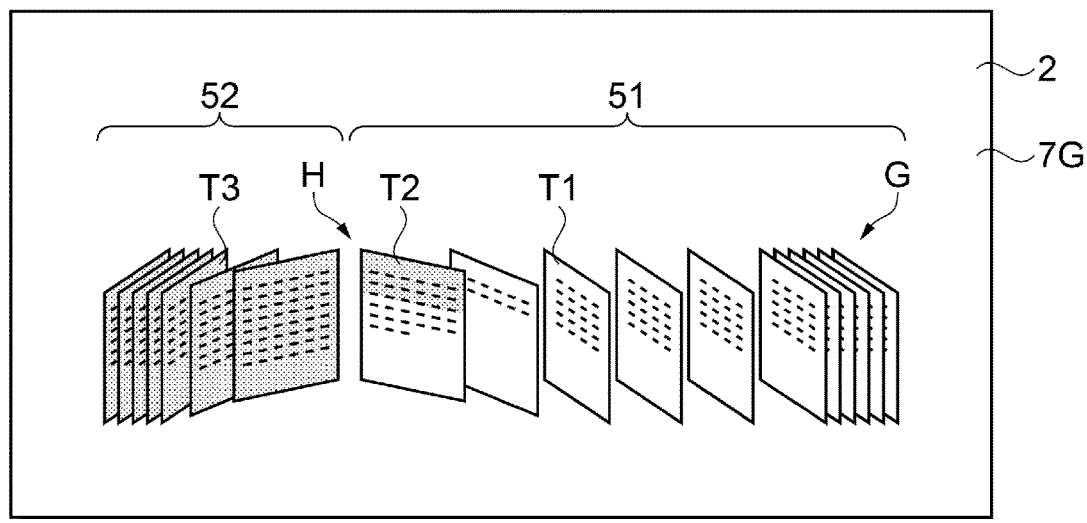
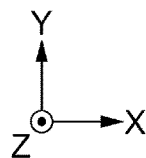
FIG. 10A
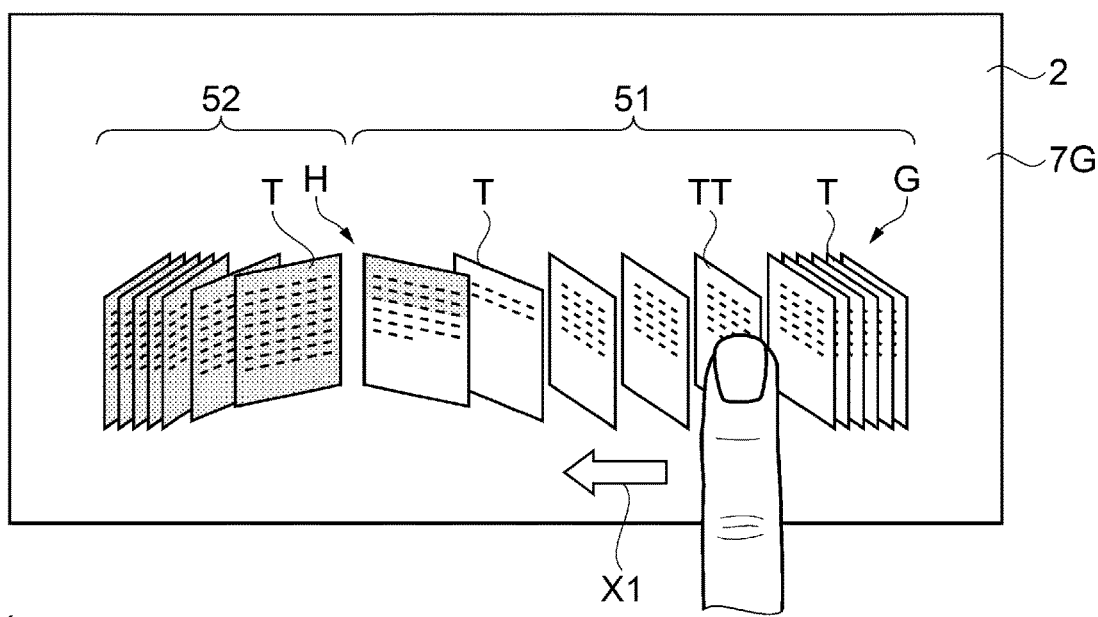
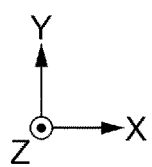

FIG. 10B
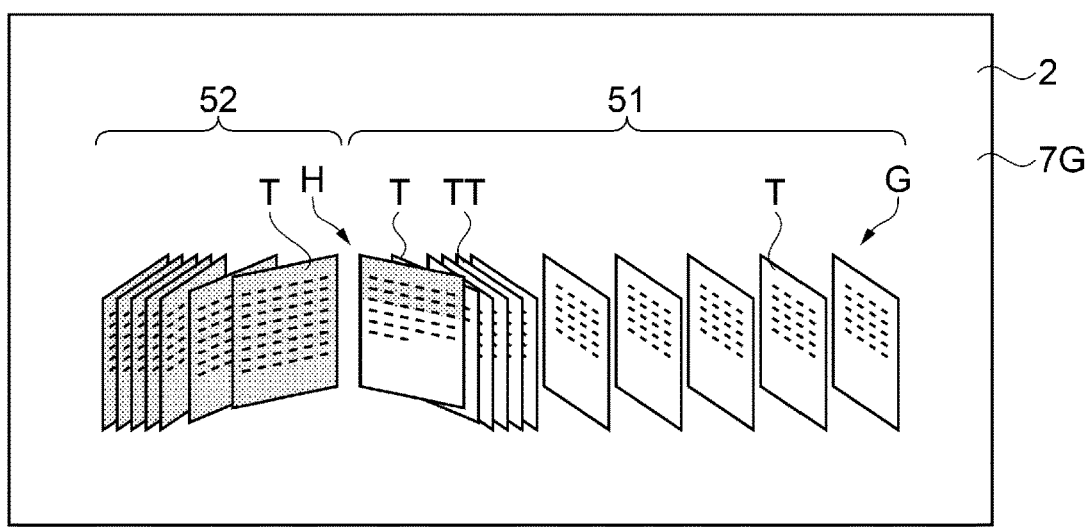
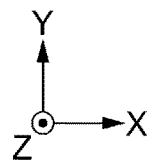
FIG. 11
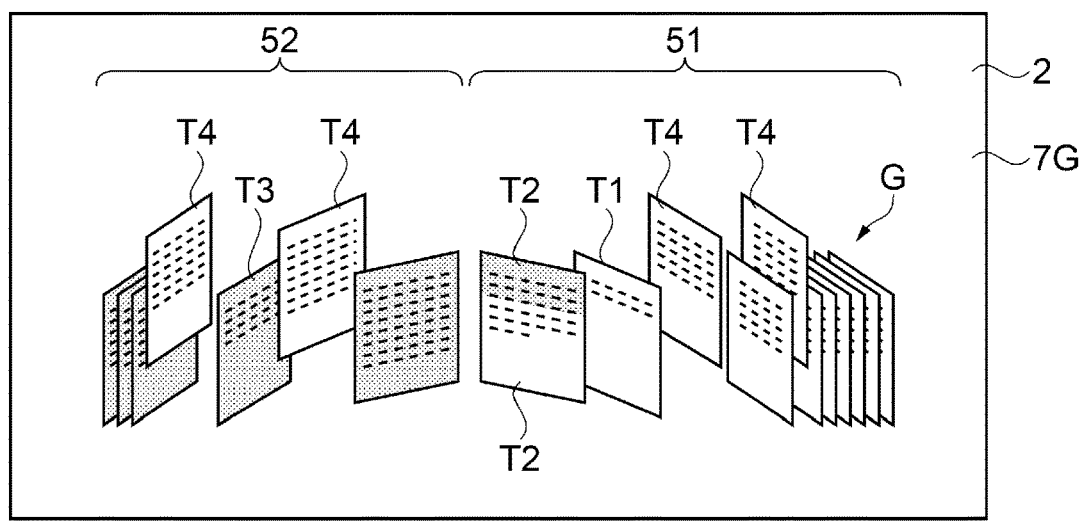
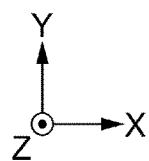

DISPLAY METHOD, DISPLAY DEVICE, AND PRINTING DEVICE

The present application is based on, and claims priority from JP Application Serial Number 2019-117092, filed Jun. 25, 2019, the disclosure of which is hereby incorporated by reference herein in its entirety.

BACKGROUND

1. Technical Field

The present disclosure relates to a display method, a display device, and a printing device.

2. Related Art

According to the related art, a photograph printing device which displays a thumbnail list screen showing a list of thumbnails corresponding to a plurality of images and arranged in a predetermined order at a display unit and prints an image corresponding to a desired thumbnail selected from the thumbnail list screen is disclosed. JP-A-2004-282224 is an example of the related art.

However, in the method of displaying a thumbnail list screen at the display unit described in JP-A-2004-282224, thumbnails are displayed as arranged next to each other on a plane. Therefore, the method has a problem in that the number of thumbnails displayed in the list in a size large enough for the user to check the contents of the images is restricted.

SUMMARY

In a display method according to an aspect of the disclosure, a plurality of images arranged on a first imaginary axis are displayed at a display unit, each image rotating about a second imaginary axis of each image intersecting the first imaginary axis, each image also rotating about the first imaginary axis. An image bundle formed of the plurality of images includes a static part where the images next to each other are arranged with an equal space from each other, and a dynamic part where the images next to each other are arranged with a broader space from each other than the images in the static part. The method includes displaying an image to be printed, of the images, in a first area of the image bundle, and displaying a printed image in a second area of the image bundle.

In the display method, the image to be printed may be displayed facing a first direction, and the printed image may be displayed facing a second direction that is different from the first direction, at an opposite side of center spread.

In the display method, when the printing of the image is finished, the image may be displayed as rotated in a different direction from before the printing of the image, about the second imaginary axis.

In the display method, the first area and the second area may be displayed next to each other on the first imaginary axis.

In the display method, the printed image may include the printed image displayed in the static part of the second area, and the printed image displayed in the dynamic part. The printed image displayed in the static part of the second area may have a longer elapsed time after the printing is finished than the printed image displayed in the dynamic part of the second area.

In the display method, a printed area of the image may be highlighted.

In the display method, the image may be shiftable along the first imaginary axis in response to an input instruction by a user.

A display device according to another aspect of the disclosure includes: a display unit displaying an image bundle formed of a plurality of images; an image generation unit generating the image bundle, rotating each image of the plurality of images arranged on a first imaginary axis about a second imaginary axis of each image intersecting the first imaginary axis, and also rotating each image about the first imaginary axis; and a control unit displaying the images next to each other in the image bundle as partly overlapping each other, displaying an image to be printed in a first area of the image bundle, and displaying a printed image in a second area of the image bundle.

A printing device according to still another aspect of the disclosure includes the foregoing display device.

BRIEF DESCRIPTION OF THE DRAWINGS

FIG. 2 shows the external appearance of the display device according to the first embodiment.

FIG. 3 shows a print status displayed at a display unit.

FIG. 4 is a block diagram showing a system configuration of the display device.

FIG. 5 is a block diagram showing the system configuration of the display device.

FIG. 6 is a flowchart showing an example of processing by the display device.

FIG. 8B illustrates the print status.
FIG. 8C illustrates the print status.
FIG. 8D illustrates the print status.
FIG. 9A illustrates center spread shifting processing.
FIG. 9B illustrates the center spread shifting processing.
FIG. 10A illustrates the thumbnail image shifting processing.
FIG. 10B illustrates the thumbnail image shifting processing.
FIG. 11 shows the print status when an instruction not to print yet is given.

DESCRIPTION OF EXEMPLARY EMBODIMENTS

First Embodiment

Figure 1:
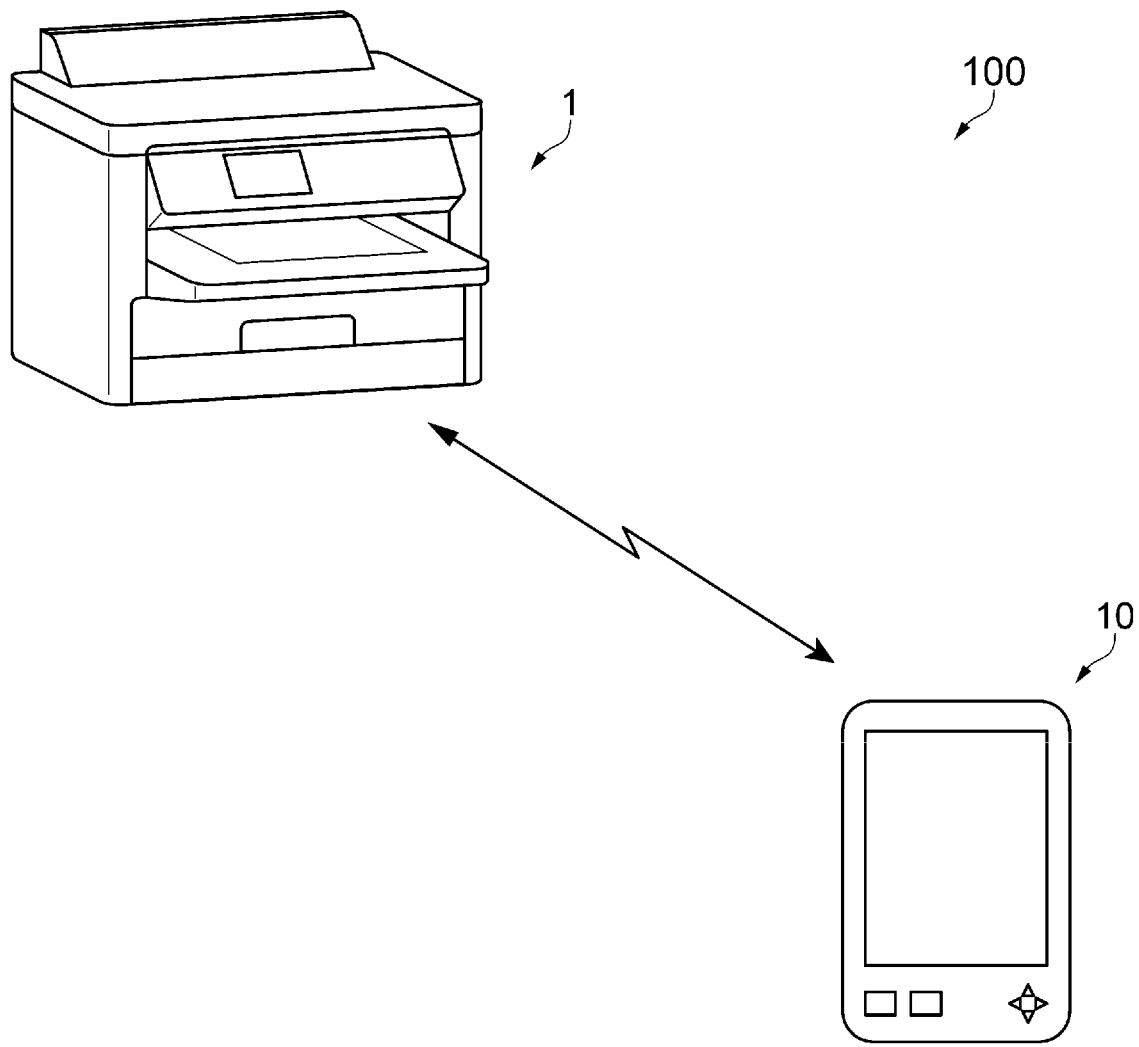
FIG. 1 is an explanatory view showing an outline of a print display system using a display device according to a first embodiment.

A display method and a display device according to a first embodiment will now be described with reference to the drawings. In the first embodiment, a viewer that can display a photograph, electronic book, or a print status of a printing device is employed as an example of the display device. In the drawings referred to in the description below, the lateral and longitudinal scales of a component or part may differ from reality for the sake of convenience of the description and illustration. Also, the illustration of a component other than a component necessary for the description may be omitted. In FIGS. 2, 3, 8A to 11, X-axis, Y-axis, and Z-axis are shown as three axes orthogonal to each other for the sake of convenience of the description. The distal end side of an arrow representing each axis is defined as "+" and the proximal end side is defined as "−". A direction along the X-axis is referred to as "lateral direction". A direction along the Y-axis is referred to as "longitudinal direction". The −X side in the lateral direction is referred to as left or left side. The +X side is referred to as right or right side. The −Y side in the longitudinal direction is referred to as down or below. The +Y side is referred to as up or above. Also, for the sake of convenience of the description, a first imaginary rotation axis Q as a first imaginary axis and a second imaginary rotation axis M as a second imaginary axis that are orthogonal to each other are shown in FIGS. 7A to 7E. The first imaginary rotation axis Q is equivalent to the X-axis. The second imaginary rotation axis M is equivalent to the Y-axis.

Outline of Print Display System

First, an outline of a print display system using the display device according to the first embodiment will be described with reference to FIG. 1.

FIG. 1 is an explanatory view showing the outline of the print display system using the display device according to the first embodiment.

A print display system 100 using a viewer 10 as the display device according to this embodiment includes the viewer 10 and a printing device 1, as shown in FIG. 1.

The viewer 10 has a wireless communication function of Wi-Fi (trademark registered) or the like that serves as an interface to transmit print data and receive a print status from the printing device 1, in order to print a displayed image.

The printing device 1 has a wireless communication function of Wi-Fi (trademark registered) to receive print data and transmit a print status to the viewer 10, in order to print the print data.

Therefore, as the viewer 10 displays a list of images to be printed, moves an already printed image according to the print status of the printing device 1, separately displays the already printed image from an image yet to be printed, and highlights the already printed image by graying out or the like, the user can easily check the print status. The highlighting is not limited to graying out. For example, the image may be changed in color to other than gray or may be changed in brightness. Also, a frame may be attached around the image.

Outline of Display Device

Next, an outline of the viewer 10 as the display device according to the first embodiment will be described with reference to FIGS. 2 and 3.

FIG. 2 shows the external appearance of the display device according to this embodiment. FIG. 3 shows a print status displayed at a display unit.

The viewer 10 according to this embodiment is a display device displaying photographs or an electronic book and can turn pages of the photographs or the electronic book in response to a user's operation on buttons 7A to 7F or a touch panel 7G shown in FIG. 2. The viewer 10 also has the wireless communication function of Wi-Fi (trademark registered) or the like and can cause the printing device 1 to print an image displayed at an image display unit 2. The viewer 10 can also check the print status of the printing device 1.

The image display unit 2 as the display unit displays an image bundle G formed of thumbnail images T arrayed along the lateral direction as reduced images of the respective pages of the photographs or the electronic book to be printed, as shown in FIG. 3. Based on the print status from the printing device 1, an image to be printed T1 and an image currently being printed T2 are displayed in a static part 55 and a dynamic part 56 of a first area 51, and a printed image T3 is displayed in a static part 55 and a dynamic part 56 of a second area 52. The first area 51 and the second area 52 are displayed next to each other along the X-axis. A printed area 60 of the thumbnail image T is highlighted by graying out or the like. The thumbnail image T in the first area 51 is displayed facing a first direction, which is to the left. The thumbnail image T in the second area 52 is displayed facing a second direction, which is to the right.

The thumbnail image T is an image having a size occupying a part of the image display unit 2 and is a reduced version of an original image. The original image is an image of a page of the photographs or the electronic book. The original image may also be an icon of an application program, or an operation screen of an application program. Each of the plurality of thumbnail images T may be assigned an application program and its operation.

The viewer 10 has the buttons 7A to 7F and the touch panel 7G, as an input unit 7, on the side where the image display unit 2 is arranged. The input unit 7 takes in an input from outside. The input unit 7 accepts an operation by the user and processes the operation as an input signal. That is, the user operates the input unit 7 and makes a predetermined input to the viewer 10.

System Configuration of Display Device

The system configuration of the viewer 10 will now be described with reference to FIGS. 4 and 5.

FIGS. 4 and 5 are block diagrams showing the system configuration of the display device.

As shown in FIG. 4, the viewer 10 has the image display unit 2, a control unit 3, a VRAM (video random-access memory) 4, a RAM (random-access memory) 5, a literature storage unit 6, the input unit 7, and a communication unit 8, which are coupled to a bus BUS. The exchange of a signal or information between the respective components coupled to the bus BUS is carried out via the bus BUS.

The image display unit 2 displays a thumbnail image T corresponding to an original image. The image display unit 2 displays an image bundle G formed of a plurality of thumbnail images T arranged next to each other in the lateral direction. The image display unit 2 displays the plurality of thumbnail images T in the state of a bird's-eye view of the image bundle G. The image display unit 2 displays a bird's-eye view image of the image bundle G arranged in an imaginary space including the first imaginary rotation axis Q as the first imaginary axis and the second imaginary rotation axis M as the second imaginary axis, as viewed from an arbitrary viewpoint in the imaginary space, as shown in FIG. 7E referred to later.

The image display unit 2 includes a display driver circuit, not illustrated, which outputs a signal causing a liquid crystal panel or the like to display an image. The image display unit 2 displays image data stored in the VRAM 4, as an image.

The control unit 3 is a device which controls each part of the viewer 10, for example, a microcomputer having a CPU (central processing unit), a ROM (read-only memory) and the like. The CPU executes a program stored in the ROM or the RAM 5, using the RAM 5 as a work area. The ROM stores, for example, an OS (operating system) for controlling basic operations of the viewer 10.

The control unit 3 controls each part of the viewer 10, based on the program stored in the ROM. For example, the control unit 3 performs control to cause the VRAM 4 to store various image data, or control to specify the content of an operation on the buttons 7A to 7F and the touch panel 7G by the user, based on an input signal sent from the input unit 7, and cause the viewer 10 to operate based on the content of the operation on the buttons 7A to 7F and the touch panel 7G. The control unit 3 also controls image processing on an image displayed at the image display unit 2. The image processing may be, for example, shifting the thumbnail image T from the first area 51 to the second area 52 according to the print status, displaying the image to be printed T1 in the first area 51, and displaying the printed image T3 in the second area 52, or highlighting the printed area 60 of the thumbnail image T.

The VRAM 4 is a memory storing image data representing an image to be displayed at the image display unit 2. The VRAM 4 is a memory where loaded image data is stored. The image data stored in the VRAM 4 is displayed at the image display unit 2.

The RAM 5 is a memory storing an association between a content of image processing executed by the control unit 3 and image data.

The literature storage unit 6 is a rewritable memory and stores image data of photograph, electronic book or the like. The literature storage unit 6 can store a plurality of different image data, and the image data are rewritable according to need. The literature storage unit 6 is a non-volatile memory storing various data and application programs in addition to the image data. The literature storage unit 6 may be, for example, a semiconductor memory built in the viewer 10 or a removable external memory such as an SD memory card.

The input unit 7 has the buttons 7A to 7F shown in FIG. 2. When the buttons 7A to 7F are operated, the input unit 7 transmits an input signal corresponding to the operated button to the control unit 3. The input unit 7 has the touch panel 7G.

The communication unit 8 has the wireless communication function of Wi-Fi (trademark registered). The communication unit 8 transmits print data of an image to be printed that is outputted from the control unit 3, to the printing device 1, and receives print status data from the printing device 1 and inputs the print status data to the control unit 3.

The control unit 3 has a GUI board unit 30 as an image generation unit, and an image data processing unit 32, as shown in FIG. 5.

The GUI board unit 30 generates the thumbnail image T, rotating each of a plurality of thumbnail images T arranged on the first imaginary rotation axis Q, about its second imaginary rotation axis M intersecting the first imaginary rotation axis Q, and also rotating the thumbnail image T about the first imaginary rotation axis Q. The GUI board unit 30 generates a bird's-eye view image of the thumbnail image bundle G arranged in the imaginary space as viewed from an arbitrary viewpoint in the imaginary space.

The GUI board unit 30 has a valid rectangle processing unit 34, an image arrangement unit 36, a 3D image processing unit 38, a touch processing unit 40, and a file instruction unit 42.

The valid rectangle processing unit 34 sets a thumbnail image display area as an occupied area.

The image arrangement unit 36 decides an angle of rotation θ of the thumbnail image T rotating about the second imaginary rotation axis M. The GUI board unit 30 generates the thumbnail image T, based on the decided angle of rotation θ.

The image arrangement unit 36 divides the image bundle G formed of the plurality of thumbnail images T into the static part 55, where the thumbnail images T next to each other partly overlap each other and are arranged with an equal space from each other, and the dynamic part 56, where the thumbnail images T next to each other are arranged with a broader space from each other than in the static part 55, where the thumbnail images T next to each other are arranged with the equal space from each other. The image arrangement unit 36 thus calculates a standard pitch between the pages.

The image arrangement unit 36 arranges the thumbnail images T in the first area 51 and in the second area 52 according to the print status. That is, the image to be printed T1 and the image currently being printed T2 are arranged in the first area 51, and the printed image T3 is arranged in the second area 52. The image currently being printed T2 may be arranged in the second area 52.

The 3D image processing unit 38 is, for example, a frame buffer or GPU.

The touch processing unit 40 detects a touch on the touch panel 7G by the user. The touch processing unit 40 acquires a touch signal from the touch panel 7G.

The file instruction unit 42 instructs the image data processing unit 32 to read the original image of a photograph or a page of an electronic book in the image data, based on data supplied from the touch processing unit 40. The file instruction unit 42 is, for example, the function of Android (trademark registered), which is a mobile operating system.

The image data processing unit 32 is, for example, a PDF library.

The image data processing unit 32 has an image size acquisition unit 44, an image acquisition unit 46, and a number-of-pages acquisition unit 48.

The image size acquisition unit 44 acquires the length in the lateral direction of the original image of the photograph or the page of the electronic book in the image data from the literature storage unit 6. The image size acquisition unit 44 acquires the length in the longitudinal direction of the original image of the photograph or the page of the electronic book in the image data from the literature storage unit 6.

The image acquisition unit 46 acquires the original image of the photograph or the page of the electronic book in the image data from the literature storage unit 6.

The number-of-pages acquisition unit 48 acquires the number of photographs or the number of pages in the image data from the literature storage unit 6.

An application unit 28 is, for example, application software such as print software for photograph, document or the like, new year card print software, or projection software to project a photograph, document or the like via a projector.

Operation of Display Device

The operation of the viewer 10 as the display device will now be described with reference to FIGS. 6 to 8D.

FIG. 6 is a flowchart showing an example of processing by the display device. FIGS. 7A to 7E illustrate thumbnail image generation processing. FIGS. 8A to 8D illustrates a print status. The operation of the control unit 3 will now be described in accordance with the flowchart of FIG. 6 and with reference to FIG. 3.

The control unit 3 generates an image bundle G in which the generated thumbnail images T are arranged in ascending order in terms of page number or printing order, from right to left in the image display unit 2.

The image arrangement unit 36 calculates arrangement positions of the thumbnail images T in the static part 55, where the thumbnail images T next to each other partly overlap each other and are arranged with an equal space from each other, and in the dynamic part 56, where the thumbnail images T next to each other are arranged with a broader space from each other than in the static part 55, where the thumbnail images T next to each other are arranged with the equal space from each other. The image arrangement unit 36 thus decides the arrangement positions of the plurality of thumbnail images T forming the image bundle G.

The flow in FIG. 6 starts in response to a predetermined event, for example, that the power of the viewer 10 is turned on, or that an instruction to display, for example, a menu screen at the viewer 10, is given.

First, in step S101, the file instruction unit 42 instructs the image acquisition unit 46 to read out, from the literature storage unit 6, an original image designated by the user using the buttons 7A to 7F or the touch panel 7G of the input unit 7. The control unit 3 acquires an image bundle G to be a processing target, in this example, the original images of a plurality of thumbnail images T included in the image bundle G.

Next, in step S102, the control unit 3 acquires data representing the order of arrangement of the plurality of thumbnail images T. This data includes an identifier of the thumbnail image T and a number representing the order of arrangement.

This data includes the number representing the order of arrangement of the thumbnail image T, and the identifier of the thumbnail images T as a file name. This data is stored in the literature storage unit 6. In step S101, the control unit 3 reads out this data from the literature storage unit 6 and acquires the original image having the file name included in this data, from the literature storage unit 6. In step S102, the control unit 3 acquires the order of arrangement of the thumbnail image T from this data.

Next, in step S103, the control unit 3 acquires a parameter used to display the image bundle G. The parameter is stored in the literature storage unit 6 along with the identifier of the image bundle G. The parameter acquired here includes the number of images and the width dimension of the image. The number of images is a parameter representing the number of the thumbnail images T included in the image bundle G. The width dimension of the image is a parameter representing the length in the lateral direction of the image bundle G.

Next, in step S104, the control unit 3 generates the image bundle G using the thumbnail image T generated by the GUI board unit 30.

To describe this in detail, the control unit 3 first reduces the original image acquired by the GUI board unit 30 in step S101 and thus generates the thumbnail image T of each page. Specifically, the GUI board unit 30 rotates each of the plurality of thumbnail images T arranged on the first imaginary rotation axis Q, about its second imaginary rotation axis M intersecting the first imaginary rotation axis Q, and also rotates the thumbnail image T about the first imaginary rotation axis Q, to generate the image bundle G formed of the plurality of thumbnail images T.

Figure 7A:
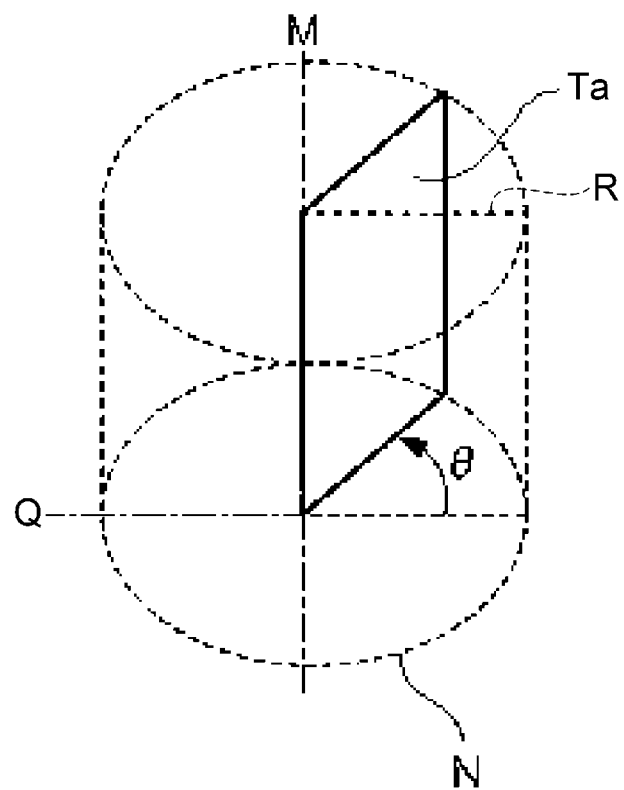
FIG. 7A illustrates thumbnail image generation processing.

The GUI board unit 30 arranges a page Ta in a standing position on the first imaginary rotation axis Q set on an imaginary horizontal plane N within an imaginary space and rotates the page Ta about its second imaginary rotation axis M intersecting the first imaginary rotation axis Q, by the angle of rotation θ from a reference position R where the lateral direction of the page Ta is parallel to the lateral direction of the display area, as shown in FIG. 7A. The GUI board unit 30 also generates an image of the page Ta rotated about its second imaginary rotation axis M within the imaginary space and further rotated about the first imaginary rotation axis Q by an angle of depression φ, not illustrated. That is, the GUI board unit 30 generates an image of the page Ta as obliquely overlooked at the angle of depression φ, not illustrated, from a viewpoint above the upper side of the page Ta rotated about the second imaginary rotation axis M in the imaginary space. In other words, each thumbnail image T is generated as a bird's-eye view image of the page Ta as perspectively viewed at the angle of depression φ, not illustrated, from a viewpoint above the upper side of the page Ta in the imaginary space. When the page is not rotated, the lateral direction of the page is parallel to the lateral direction of the display area and the angle of rotation θ is 0°. The angle of depression φ is a predetermined angle. The second imaginary rotation axis M is not limited to being parallel to the side in the longitudinal direction of the page and may intersect the side in the lateral direction of the page.

Figure 7B:
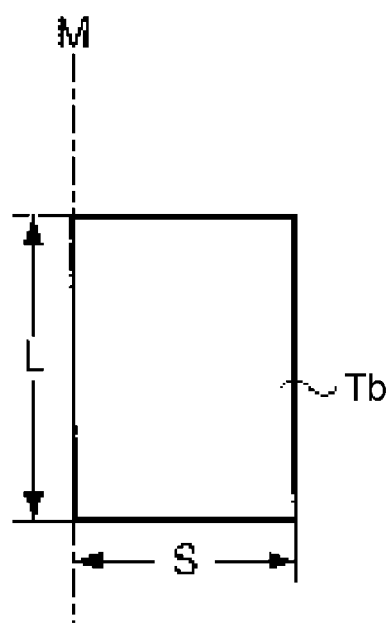
FIG. 7B illustrates the thumbnail image generation processing.
Figure 7C:
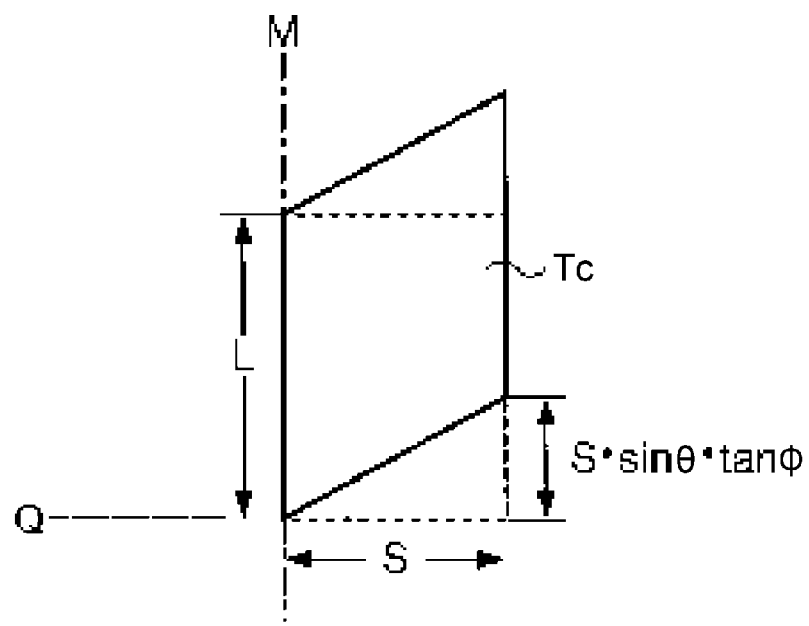
FIG. 7C illustrates the thumbnail image generation processing.
Figure 7D:
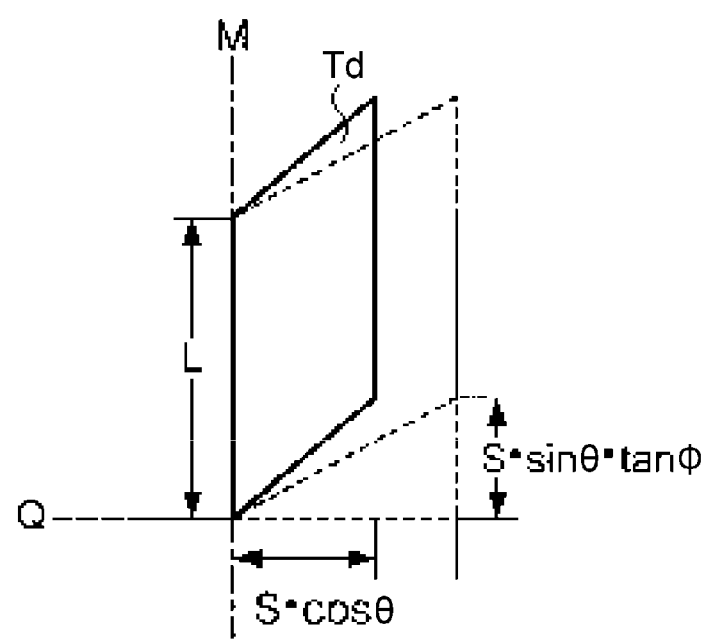
FIG. 7D illustrates the thumbnail image generation processing.
Figure 7E:
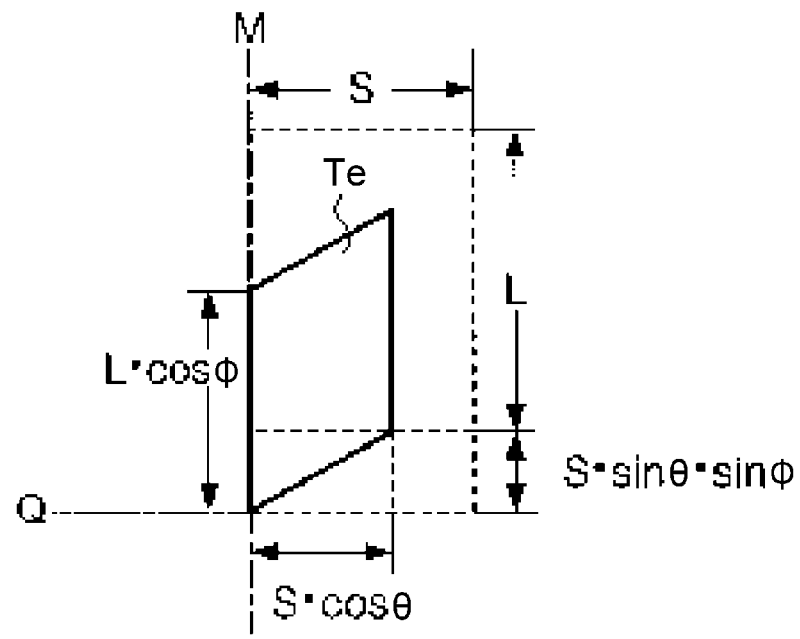
FIG. 7E illustrates the thumbnail image generation processing.

Specifically, the GUI board unit 30 first longitudinally deforms an image Tb having a longitudinal dimension L and a lateral dimension S shown in FIG. 7B of each page as viewed from the front, without changing the lateral width, as shown in FIG. 7C, and thus generates an image Tc resulting from shifting the right side of the image Tb in FIG. 7B by $S \cdot \sin θ \cdot \tan φ$ in relation to the left side. Next, the GUI board unit 30 generates an image Td resulting from reducing the image Tc in FIG. 7C in the lateral direction by a magnification of case, as shown in FIG. 7D. Consequently, the lateral width of the image Td is $S \cdot \cos θ$. Finally, the GUI board unit 30 generates an image Te resulting from reducing the image Td in FIG. 7D by a magnification of cost, as shown in FIG. 7E. Consequently, the dimension in the longitudinal direction of the image Te is $L \cdot \cos φ$. Thus, the thumbnail image T of the page rotated by the angle of rotation θ about the second imaginary rotation axis M and also rotated about the first imaginary rotation axis Q is generated. In other words, the thumbnail image T of the page rotated by the angle of rotation θ about the second imaginary rotation axis M and overlooked at the angle of depression φ from a viewpoint above the upper side of the page is generated.

Subsequently, based on the X-coordinate of each page calculated by the image arrangement unit 36, the thumbnail images T generated by the GUI board unit 30 are arranged on the first imaginary rotation axis Q. Then, the generation of the image bundle G ends.

Next, in step S105, the control unit 3 displays, at the image display unit 2, the image bundle G formed of the thumbnail images T generated in step S104.

Figure 8A:
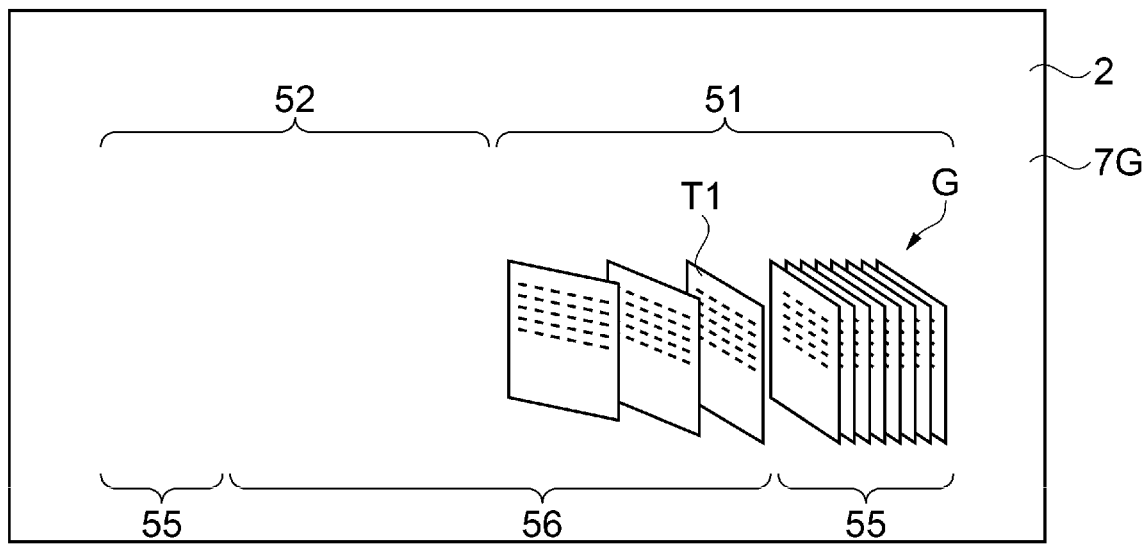
FIG. 8A illustrates a print status.

FIG. 8A shows an example where the image bundle G formed of the thumbnail images T to be printed is displayed at the image display unit 2. The image bundle G is arranged in the first area 51 since it is before printing. The thumbnail image T of the first page is displayed at a center part of the image display unit 2. The thumbnail images T of the latter pages are arranged in the static part 55 of the image display unit 2, with the thumbnail images T next to each other partly overlapping with an equal space from each other. The thumbnail image T arranged in the dynamic part 56 of the image display unit 2 is generated with its angle of rotation θ by which to rotate clockwise about the second imaginary rotation axis M shown in FIG. 7A being set to be smaller than the angle of rotation θ of the thumbnail image T arranged in the static part 55 of the image display unit 2. Thus, the thumbnail image T arranged in the dynamic part 56 of the image display unit 2 has a broader display area. This enables the user to easily check the content of the thumbnail image T.

Next, in step S106, the control unit 3 transmits print data to the printing device 1 on receiving a print instruction from the user. On receiving the print data, the printing device 1 starts printing and sequentially transmits printed area data as the print status to the viewer 10. On receiving the printed area data, the control unit 3 in the viewer 10 performs on the image currently being printed T2 processing to highlight the printed area 60 by graying out or the like based on the printed area data and displays the highlighted printed area 60 at the image display unit 2, as shown in FIG. 8B.

Subsequently, when the printing of the image currently being printed T2 is finished, the control unit 3 moves the printed image T3 from the first area 51 to the second area 52 and displays the printed image T3 rotated counterclockwise, which is a different direction from the rotation of the image to be printed T1, about the second imaginary rotation axis M, as shown in FIG. 8C. The angle of rotation θ of the printed image T3 is the same as the angle of rotation θ of the image currently being printed T2 though different in being positive or negative. That is, when clockwise rotation about the second imaginary rotation axis M is defined as positive, the angle of rotation θ of the image to be printed T1 arranged in the first area 51 is +θ and the angle of rotation θ of the printed image T3 arranged in the second area 52 is −θ.

Therefore, when the first direction is to the left along the lateral direction, the control unit 3 displays the image to be printed T1 facing to the left. When the second direction different from the first direction at the opposite side of a center spread H is to the right, the control unit 3 displays the printed image T3 facing to the right. Thus, the user can check the image to be printed T1 and the printed image T3 more easily. The center spread H is a part where the image T1 displayed as facing to the left and the image T3 displayed as facing to the right are located next to each other.

As the printing of the image to be printed T1 arranged in the first area 51 proceeds and the number of the printed images T3 increases, the control unit 3 moves the printed image T3 to the static part 55 of the second area 52 and arranges the printed images T3 next to each other partly overlapping in the static part 55 of the second area 52, as shown in FIG. 8D. The printed image T3 in the static part 55 of the second area 52 is displayed with its angle of rotation θ being set to be greater than the angle of rotation θ of the printed image T3 in the dynamic part 56 of the second area 52.

The thumbnail image T arranged in the dynamic part 56 is displayed with its angle of rotation θ being set to increase as it goes away from the center spread H. That is, the angle of rotation θ of the thumbnail image T arranged on the static part 55 side is greater than the angle of rotation θ of the thumbnail image T arranged on the center spread H side.

In the second area 52, the printed image T3 displayed in the static part 55 has a longer elapsed time after the printing is finished, than the printed image T3 displayed in the dynamic part 56. Of the plurality of printed images T3, a printed image T3 having a longer elapsed time after the printing is finished is arranged nearer to the left end of the second area 52, and a printed image T3 having a shorter elapsed time after the printing is finished is arranged nearer to the right end of the second area 52.

Subsequently, when the printing of all the thumbnail images T is finished, the control unit 3 displays all the printed images T3 in the second area 52.

As the image to be printed T1 is displayed in the first area 51 and the printed image T3 is displayed in the second area 52 of the image display unit 2, as described above, the user can easily check the print status in the printing device 1 via the viewer 10. The flow in FIG. 6 ends in response to a predetermined event, for example, that the power of the viewer 10 is turned off or that, for example, an instruction to end the display of the menu screen at the viewer 10 is given.

The display device according to this embodiment is not limited to the viewer 10 and may be an electronic book reader, personal computer, PDA (personal digital assistant), smartphone or the like.

To display a photograph or a page of an electronic book as a thumbnail image T at the personal computer, PDA or smartphone, a program implementing the control unit 3 shown in FIG. 4 is installed and this program is executed. Thus, a photograph or a page of an electronic book is displayed as a thumbnail image T.

In the viewer 10 as the display device, and the display method as described above, the image bundle G formed of the image to be printed T1 and the printed image T3 includes a part where the thumbnail images T next to each other are displayed as partly overlapping each other. Therefore, more thumbnail images T can be displayed at the image display unit 2 than when thumbnail images T are arranged on a plane. Also, since the image to be printed T1 is displayed in the first area 51 and the printed image T3 is displayed in the second area 52, the user can easily check the number of the images to be printed T1 and the number of the printed images T3 and can grasp the print status in the printing device 1.

Also, since the image to be printed T1 and the printed image T3 are displayed facing in the opposite directions, the image to be printed and the printed image can be easily checked.

Moreover, since the printed area 60 in the printed image T3 and the image currently being printed T2 is highlighted by graying out or the like, the degree of progress of printing in the printing device 1 can be easily checked.

A display method when the user carries out a predetermined operation using the buttons 7A to 7F or the touch panel 7G in the input unit 7 will now be described, using display examples 1 to 3.

Display Example 1

A display method in which the center spread H in the image bundle G is shifted will be described with reference to FIGS. 9A and 9B.

FIGS. 9A and 9B illustrate center spread shifting processing. The components in the viewer 10 are denoted by the same reference signs as above.

As shown in FIG. 9A, the user touches the center spread H in the image bundle G with a finger, shifts the center spread H to the left as indicated by an arrow X1, and releases the finger from the touch panel 7G. In response to this, the control unit 3 shifts the center spread H in the direction of the arrow X1 at the image display unit 2, as shown in FIG. 9B. The width in the lateral direction of the second area 52 becomes narrower. Therefore, the control unit 3 reduces the space between the printed images T3 next to each other. Meanwhile, the width in the lateral direction of the first area 51 becomes broader. Therefore, the control unit 3 increases the space between the images to be printed T1 next to each other.

In this display method, since the space between the images to be printed T1 becomes broader, the contents of the images to be printed T1 can be checked more easily. Meanwhile, when the center spread H is shifted into the direction opposite to the arrow X1, the space between the printed images T3 becomes broader. Therefore, the contents of the printed images T3 can be checked more easily. The control unit 3 does not perform the processing of moving the printed image T3 to the second area 52 when the center spread H is far away from the center part of the image display unit 2 or when the user is carrying out a predetermined operation.

Display Method 2

A display method in which the thumbnail image T in the image bundle G is shifted will be described with reference to FIGS. 10A and 10B.

FIGS. 10A and 10B illustrate thumbnail image shifting processing. The components in the viewer 10 are denoted by the same reference signs as above.

As shown in FIG. 10A, the user touches a thumbnail image TT selected from the image bundle G with a finger, shifts the thumbnail image TT to the left as indicated by an arrow X1, and releases the finger from the touch panel 7G. In response to this, the control unit 3 shifts the selected thumbnail image TT in the direction of the arrow X1 at the image display unit 2, as shown in FIG. 10B. In the first area 51, the control unit 3 displays the thumbnail images T arranged next to each other to the left of the selected thumbnail image TT with a narrower space from each other, and the thumbnail images T arranged next to each other to the right of the selected thumbnail image TT with a broader space from each other.

In this display method, since the space between the thumbnail images T arranged to the right of the selected thumbnail image TT becomes broader, the contents of the thumbnail images T can be checked more easily. Meanwhile, when the selected thumbnail image TT is shifted into the direction opposite to the arrow X1, the space between the thumbnail images T arranged to the left of the selected thumbnail image TT becomes broader. Therefore, the contents of the thumbnail images T can be checked more easily.

Display Example 3

A display method in which the print status of the image bundle G displayed at the image display unit 2, including a thumbnail image T4 that is not to be printed, is displayed will be described with reference to FIG. 11.

FIG. 11 illustrates the print status when an instruction not to print is given. The components in the viewer 10 are denoted by the same reference signs as above.

Before printing is started, the user touches, with a finger, the thumbnail image T4 that is not to be printed from among the image bundle G displayed at the image display unit 2 and shifts the thumbnail image not to be printed T4 upward. In response to this, the control unit 3 determines that the thumbnail image T4 shifted upward is an image not to be printed, and no-print information to the printing device 1. Therefore, as printing proceeds, the thumbnail image T4 that is not to be printed shifts to the second area 52 along with the printed image T3 while staying in the upper position, as shown in FIG. 11.

In this display method, the user can select the thumbnail image T4 that is not to be printed from among the image bundle G, and can more easily grasp the print status including that of the thumbnail image T4 that is not to be printed.

Second Embodiment

As a second embodiment, a printing device 20 having the display device according to the first embodiment will now be described with reference to FIG. 12.

Figure 12:
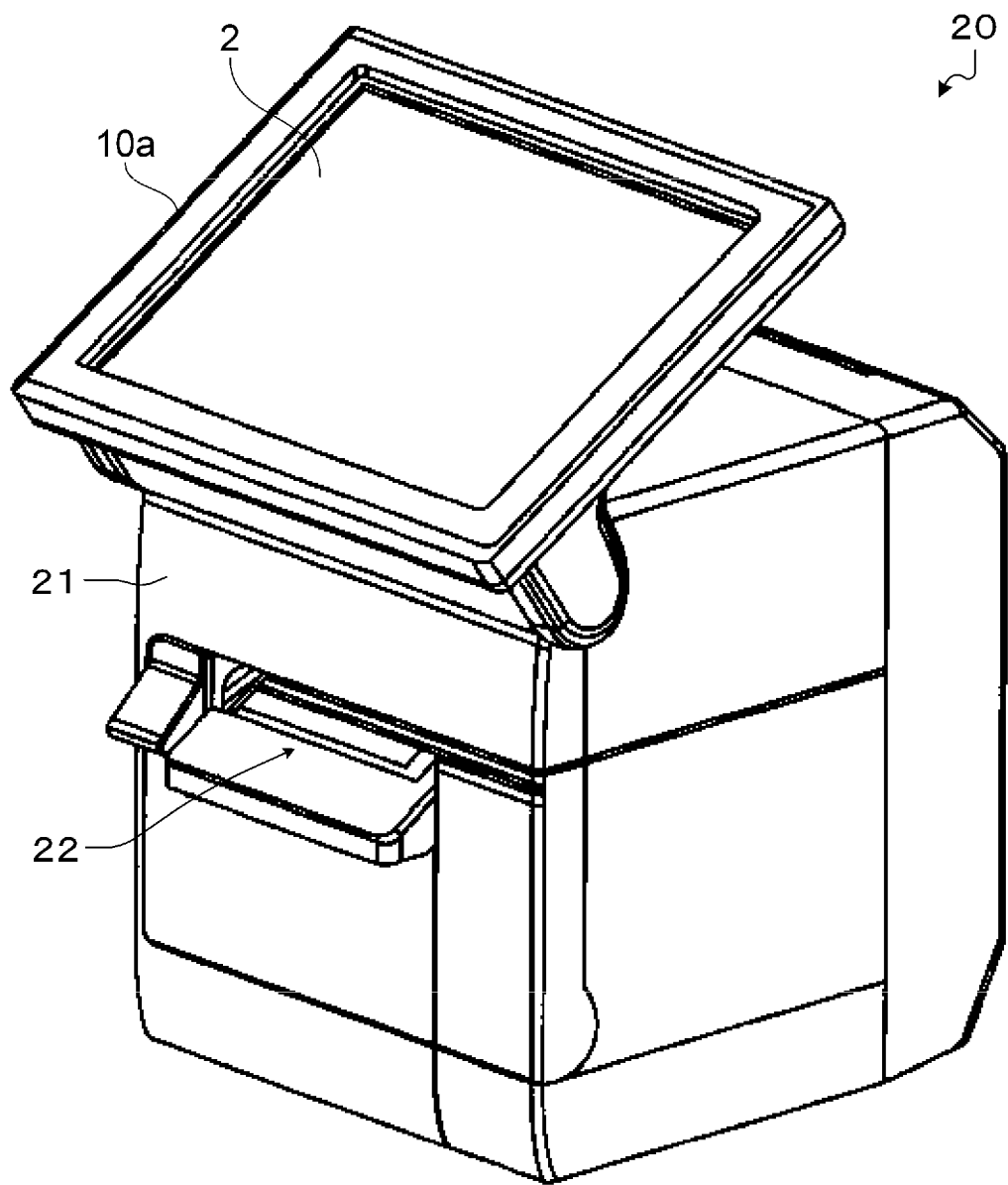
FIG. 12 shows the external appearance of a printing device according to a second embodiment.

FIG. 12 shows the external appearance of the printing device according to the second embodiment.

The printing device 20 has a display device 10a having the image display unit 2, a case 21, and a print medium discharge unit 22, as shown in FIG. 12.

The display device 10a displays the thumbnail image T at the image display unit 2, and also has a light-transmissive pressure-sensitive touch panel and functions as an input unit, as in the first embodiment.

The printing device 20 has a print mechanism, a roll print medium, and a print mechanism control unit, inside the case 21. Based on an instruction from the display device 10a, the printing device 20 controls the print mechanism via the print mechanism control unit, prints print data onto the print medium held inside, and discharges the printed print medium from the print medium discharge unit 22.

At the image display unit 2 of the display device 10a, print data received from an external device and stored in the literature storage unit, a photograph or electronic book stored in the literature storage unit, and the like are displayed.

Thus, the printing device 20 according to this embodiment enables the user to check a large number of thumbnail images T displayed in a list, edit a photograph or a page of an electronic book which the user wants to print, and subsequently print the edited photograph or page. Therefore, wrong printing can be prevented. Also, since the thumbnail images T to be printed are displayed in a list and the image to be printed T1 and the printed image T3 are displayed separately from each other, the user can easily grasp the print status.

The contents derived from the foregoing embodiments are described below.

In a display method, a plurality of images arranged on a first imaginary axis are displayed at a display unit, each image rotating about a second imaginary axis of each image intersecting the first imaginary axis, each image also being rotating about the first imaginary axis. An image bundle formed of the plurality of images includes a static part where the images next to each other are arranged with an equal space from each other, and a dynamic part where the images next to each other are arranged with a broader space from each other than the images in the static part. The method includes displaying an image to be printed, of the images, in a first area of the image bundle, and displaying a printed image in a second area of the image bundle.

According to this display method, images next to each other in the image bundle formed of the image to be printed and the printed image are displayed as partly overlapping each other. Therefore, more images can be displayed at the display unit than when images are arranged on a plane. Also, since the image to be printed is displayed in the first area and the printed image is displayed in the second area, the user can easily check the number of the images to be printed and the number of the printed images.

In the display method, the image to be printed may be displayed facing a first direction, and the printed image may be displayed facing a second direction that is different from the first direction, at an opposite side of center spread.

According to this display method, the image to be printed and the printed image are displayed facing different directions from each other. Therefore, the user can easily check the image to be printed and the printed image.

In the display method, when the printing of the image is finished, the image may be displayed as rotated in a different direction from before the printing of the image, about the second imaginary axis.

According to this display method, when the printing of the image is finished, the printed image is displayed as rotated in a different direction from the rotation of the image to be printed about the second imaginary axis. Therefore, the user can easily check the image to be printed and the printed image.

In the display method, the first area and the second area may be displayed next to each other on the first imaginary axis.

According to this display method, the first area and the second area are displayed next to each other on the first imaginary axis. Therefore, the user can easily check the image to be printed, displayed in the first area, and the printed image displayed in the second area.

In the display method, the printed image may include the printed image displayed in the static part of the second area, and the printed image displayed in the dynamic part. The printed image displayed in the static part of the second area may have a longer elapsed time after the printing is finished than the printed image displayed in the dynamic part of the second area.

According to this display method, the printed image having a longer elapsed time after the printing is finished is displayed in the static part, where the space between images next to each other is narrower, and the printed image having a shorter elapsed time after the printing is finished is displayed in the dynamic part, where the space between images next to each other is broader. Therefore, the printed image having a shorter elapsed time after the printing is finished has a broader area not overlapping the neighboring printed image. Thus, the user can easily check the printed content.

In the display method, a printed area of the image may be highlighted.

According to this display method, since the printed area of the printed image is highlighted, the user can easily check the degree of progress of printing.

In the display method, the image may be shiftable along the first imaginary axis in response to an input instruction by a user.

According to this display method, since the image is shiftable along the first imaginary axis, the space between images next to each other can be increased. Thus, the user can easily check the content of the image.

A display device includes: a display unit displaying an image bundle formed of a plurality of images; an image generation unit generating the image bundle, rotating each image of the plurality of images arranged on a first imaginary axis about a second imaginary axis of each image intersecting the first imaginary axis, and also rotating each image about the first imaginary axis; and a control unit displaying the images next to each other of the image bundle as partly overlapping each other, displaying an image to be printed in a first area of the image bundle, and displaying a printed image in a second area of the image bundle.

According to this display device, images next to each other in the image bundle formed of the image to be printed and the printed image are displayed as partly overlapping each other. Therefore, more images can be displayed at the display unit than when images are arranged on a plane. Also, since the image to be printed is displayed in the first area and the printed image is displayed in the second area, the user can easily check the number of the images to be printed and the number of the printed images.

A printing device includes the foregoing display device.

According to this printing device, images next to each other in the image bundle formed of the image to be printed and the printed image are displayed as partly overlapping each other. Therefore, more images can be displayed at the display unit than when images are arranged on a plane. Also, since the image to be printed is displayed in the first area and the printed image is displayed in the second area, the user can easily check the number of the images to be printed and the number of the printed images.

What is claimed is:

1. A display method in which a plurality of images arranged on a first imaginary axis are displayed at a display, each image rotating about a second imaginary axis of each image intersecting the first imaginary axis, each image also rotating about the first imaginary axis, and
    in which an image bundle formed of the plurality of images includes
    a static part where the images next to each other are arranged with an equal space from each other, and
    a dynamic part where the images next to each other are arranged with a broader space from each other than the images in the static part,
    the method comprising displaying an image to be printed, of the images, in a first area of the image bundle, and displaying a printed image in a second area of the image bundle,
    wherein, when printing of an image is at a stage where a first part of the image has been printed and a second part of the image remains to be printed, the first part is highlighted and the second part is not highlighted.

2. The display method according to claim 1, wherein the image to be printed is displayed facing a first direction, and the printed image is displayed facing a second direction that is different from the first direction, at an opposite side of center spread.

3. The display method according to claim 1, wherein when the printing of the image is finished, the image is displayed as rotated in a different direction from before the printing of the image, about the second imaginary axis.

4. The display method according to claim 1, wherein the first area and the second area are displayed next to each other on the first imaginary axis.

5. The display method according to claim 1, wherein the printed image includes the printed image displayed in the static part of the second area, and the printed image displayed in the dynamic part, and
    the printed image displayed in the static part of the second area has a longer elapsed time after the printing is finished than the printed image displayed in the dynamic part of the second area.

6. The display method according to claim 1, wherein the image is shiftable along the first imaginary axis in response to an input instruction by a user.

7. A display device comprising:
    a display displaying an image bundle formed of a plurality of images;
    an image generator generating the image bundle, rotating each image of the plurality of images arranged on a first imaginary axis about a second imaginary axis of each image intersecting the first imaginary axis, and also rotating each image about the first imaginary axis; and a controller displaying the images next to each other in the image bundle as partly overlapping each other, displaying an image to be printed in a first area of the image bundle, and displaying a printed image in a second area of the image bundle, wherein, when printing of an image is at a stage where a first part of the image has been printed and a second part of the image remains to be printed, the controller highlights the first part and does not highlight the second part.

8. A printing device comprising:
the display device according to claim 7.

* * * * *